United States Patent
Weindorf

(10) Patent No.: US 9,939,636 B2
(45) Date of Patent: Apr. 10, 2018

(54) FORWARD LOOKING LIGHT SENSOR WITH A ROUNDED APERTURE, AND AN OPTIMAL THICKNESS AND RADIUS FOR THE APERTURE

(71) Applicant: Paul Fredrick Luther Weindorf, Novi, MI (US)

(72) Inventor: Paul Fredrick Luther Weindorf, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 12 days.

(21) Appl. No.: 14/557,100

(22) Filed: Dec. 1, 2014

(65) Prior Publication Data

US 2016/0153831 A1    Jun. 2, 2016

(51) Int. Cl.
G02B 27/01 (2006.01)
G01J 1/02 (2006.01)
G01J 1/32 (2006.01)

(52) U.S. Cl.
CPC ............ G02B 27/01 (2013.01); G01J 1/0266 (2013.01); G01J 1/32 (2013.01)

(58) Field of Classification Search
CPC . H01L 2224/05011; H01L 2224/05551; H01L 2224/29011; H01L 2924/15151; H01L 2924/17151; H04N 2201/02493; H04N 1/19547; G02B 21/004; G02B 6/3644

USPC ............. 250/208.1, 216; 348/266–332; 257/291–338

See application file for complete search history.

(56) References Cited

U.S. PATENT DOCUMENTS

| | | | | |
|---|---|---|---|---|
| 833,897 A | * | 10/1906 | Brinro et al. | A24F 15/18 131/234 |
| 6,479,810 B1 | | 11/2002 | Weindorf | |
| 6,483,245 B1 | | 11/2002 | Weindorf et al. | |
| 6,507,286 B2 | | 1/2003 | Weindorf et al. | |
| 6,762,741 B2 | | 7/2004 | Weindorf | |
| 2007/0252909 A1 | * | 11/2007 | Tanaka | H01L 27/14625 348/294 |
| 2009/0140125 A1 | * | 6/2009 | Takayama | H01L 27/14618 250/214 R |
| 2013/0026350 A1 | * | 1/2013 | Yao | G01V 8/20 250/221 |

OTHER PUBLICATIONS

"Standard Metrology for Vehicular Displays" SAE International, Jul. 2002, Revised Apr. 2007, pp. 1-27, J1757-1, Available online at www.cie.co.at.

(Continued)

*Primary Examiner* — Tony Ko
(74) *Attorney, Agent, or Firm* — Dickinson Wright PLLC

(57) ABSTRACT

A forward looking light sensor is described herein. The sensor includes a first light blocking material; a second light blocking material; and a light sensor with a first surface and a second surface. The first light blocking material is disposed on the first surface of the light sensor and the second light blocking material is disposed on the first surface of the light sensor, and the first light blocking material and the second light blocking forming an aperture.

1 Claim, 4 Drawing Sheets

(56) References Cited

OTHER PUBLICATIONS

"Road vehicles—Ergonomic aspects of transport information and control systems—Specification and test procedures for in-vehicle visual presentation" International Standard, Feb. 15, 2009 (second edition), pp. 1-18, ISO 15008 (Ref. No. ISO 15008:2009(E)), Switzerland.
"Ergonomic requirements for work with visual displays based on flat-panels—Part 2: Ergonomics requriements for flat panel displays," International Standard, Dec. 1, 2001(first edition), pp. 1-148. ISO 13406-2 (Ref. No. ISO 13406-2:2001(E)), Switzerland.
Silverstein et al., "The Development and Evaluation of Color Systems for Airborne Applications—Fundamental Visual, Perceptual, and Display Systems Considerations," SAE International, Oct. 14, 1985, pp. 241-365, Paper No. 851774.
Silicon PIN Photodiode, Version 1.1. BPW 34 S, OSRAM Opto Semiconductors, Jan. 9, 2014, pp. 1-10, Osram Opto Semiconductors GmbH, Regensburg, Germany.
IDMS Download Page, The Society for Information Display (SID), Mar. 31, 2015, pp. 1-3, available online at http://www.sid.org/Publications/ICDM/oldIDMSLicenseamp;Download.aspx.

\* cited by examiner

FORWARD LOOKING LIGHT SENSOR WITH A ROUNDED APERTURE, AND AN OPTIMAL THICKNESS AND RADIUS FOR THE APERTURE

BACKGROUND

A forward looking light sensor is customarily provided to detect a light or luminance that a viewer may see while looking outward or through a forward facing surface (e.g. a windshield). For example, if the viewer is looking outside of a window, a windshield, the forward looking light sensor may be employed to detect the light the viewer sees.

The sensor may be coupled with an electronic detection device to determine the amount of luminance the forward looking light sensor comes in contact with. In certain cases, the forward looking light sensor's detected light may be utilized to adjust the luminance. A forward looking light sensor, and specifically a logarithmic forward looking light sensor, may be employed to perform an adjustment of an electronic display or a heads-up display (HUD).

In conventional technologies, a methodology proposed by Dr. Silverstein has been disclosed to employ linearly sensed light to adjust a display based on the sensed light. As noted in the related applications, new concepts employing several sensors as well as logarithmic sensors are proposed.

Dr. Silverstein methodology recommended a lens that attenuates incident light as a function of the cosine squared of the angle of incidence of light to the sensor. In employing a lens based solution, the solution may become costly and complex.

DESCRIPTION OF THE DRAWINGS

The detailed description refers to the following drawings, in which like numerals refer to like items, and in which.

SUMMARY

Figure 1:
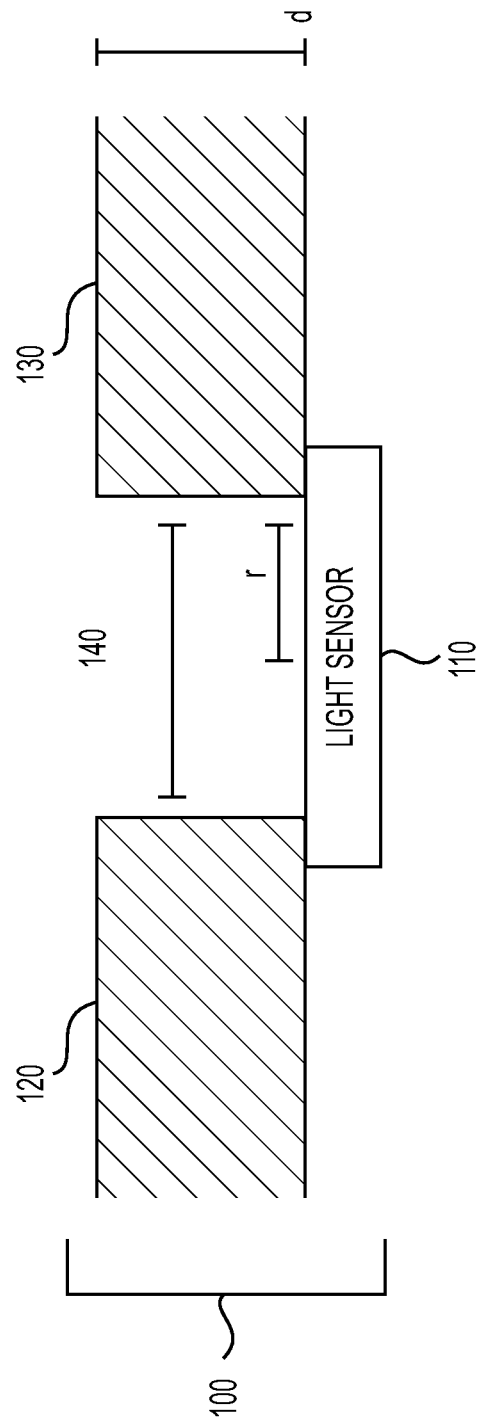
FIG. 1 illustrates an example of a forward looking light sensor according to the aspects disclosed herein.

A forward looking light sensor is described herein. The sensor includes a first light blocking material; a second light blocking material; and a light sensor with a first surface and a second surface. The first light blocking material is disposed on the first surface of the light sensor and the second light blocking material is disposed on the first surface of the light sensor, and the first light blocking material and the second light blocking forming an aperture.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art.

It will be understood that for the purposes of this disclosure, "at least one of each" will be interpreted to mean any combination of the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Forward looking light sensors may facilitate the adjustment of display systems. Further, when implementing the forward looking light sensor as a logarithmic forward looking light sensor, the light adjustment systems may operate in an efficient and advantageous way.

However, these sensors have conventionally been implemented or proposed to be implemented via a lens-based solution. The employment of lens may be more costly and unnecessarily burdensome.

Thus, disclosed herein is a logarithmic forward looking light sensor. The aspects disclosed herein are directed to a non-lens based solution. The aspects disclosed herein implement a shadowing technique along with a light sensor and light blocking material. A method for implementing a sensor as disclosed herein is also described.

FIG. 1 illustrates an example of a forward looking light sensor 100 according to the aspects disclosed herein. As shown in FIG. 1, the sensor 100 includes a light sensor 110, a first light blocking material 120, and a second light block material 130. The light blocking materials 120 and 130 each have a thickness of d. Further, the light blocking materials 120 and 130 are placed on a respective edge of the light sensor 110, and form an aperture 140. The aperture 140 has a dimension of '2×r'. This value of '2×r' will be important in determining the light sensing discussed herein.

Figure 2A:
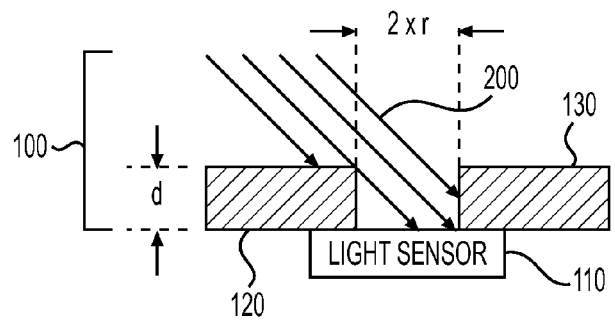
FIGS. 2(a), (b), (c), and (d) illustrate an example of the forward looking light sensor shown along with light rays.

FIGS. 2(a), (b), (c), and (d) illustrate an example of the forward looking light sensor 100 shown along with light rays 200.

FIG. 2(a) illustrates the sensor 100 with the areas being blocked by the light blocking materials 120 and 130 being blacked out. Thus, the light rays 200 propagate onto the light sensor 110 wherever the aperture 140 allows light to pass on through.

Figure 2B:
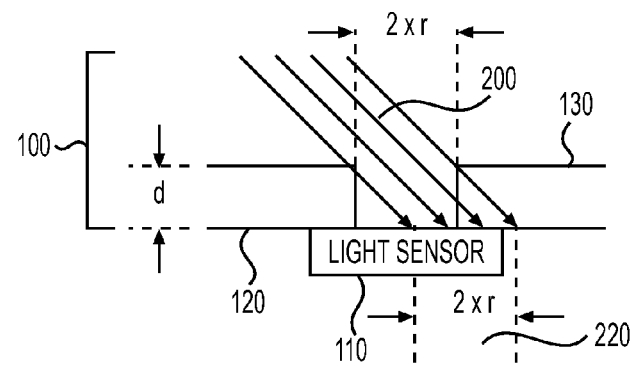

FIG. 2(b) illustrates the sensor 100 with the areas being blocked by the light blocking materials 120 and 130 being shown as though the areas would allow light to pass through. As shown, if not for the light blocking material 130, the amount of distance which would be hit by light rays 200 is also '2×r'. This fictional area 220 may be also viewed as a circle.

Figure 2C:
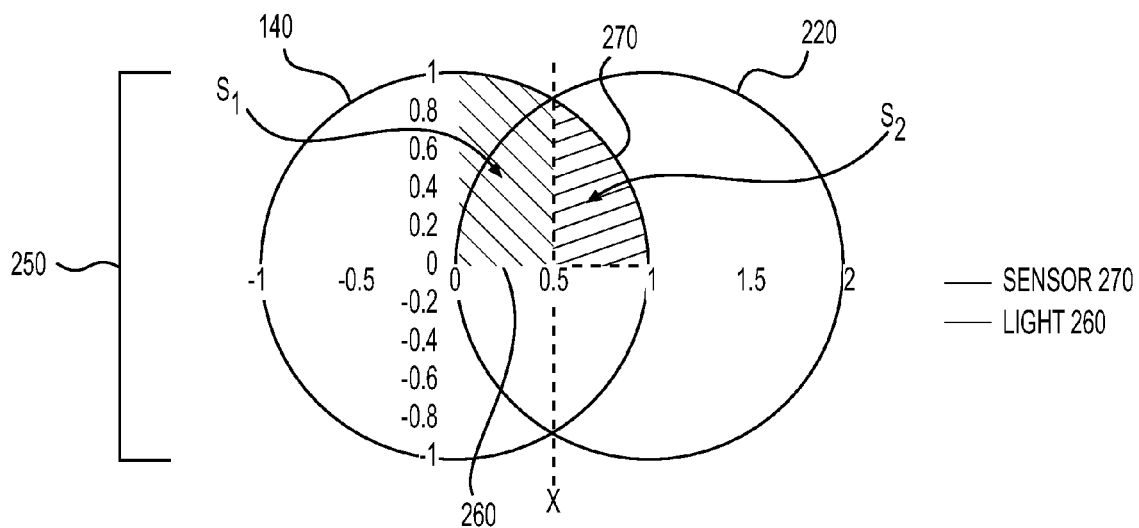

FIG. 2(c) illustrates a diagram 250 illustrating aperture 140 and fictional area 220 overlapping. The radius of each circle is defined as 1 for the sake of explanation. However, depending on the implementation of sensor 100, this parameter may change.

The diagram 250 includes two regions $S_1$ (260) and $S_2$ (270). $S_1$ 260 refers to the area in which the sensor 110 and the aperture 140 overlap and in which the light rays 200 make contact with. $S_2$ 270 refers to the area light blocking material 130 defines as to where light rays 200 would make contact with (if allowed to pass through).

The following set of equations prove mathematically how the above-described sensor 100 may effectively be employed as a logarithmic light sensor 100. Further, they describe a methodology as to how to optimize the dimensions associated with a light sensor to adequately be employed as a cosine squared light sensor.

$$x^2+y^2=r^2$$

Solving for the above equation produces:

$$y=\sqrt{r^2-x^2}$$

Performing calculus operation on $S_1$ 260 (a derivative and integration), the following expressions are realized:

$$\frac{dS_1}{dx}=y=\sqrt{r^2-x^2}$$

$$S_1=\int_0^x \sqrt{r^2-x^2}\,dx=\frac{r^2}{2}\sin^{-1}\left(\frac{x}{r}\right)+\frac{x}{2}\sqrt{r^2-x^2}$$

Once the area of $S_1$ 260 is ascertained, $S_2$ 270 may be found by taking $\frac{1}{4}^{th}$ the area of the circle, and subtracting $S_1$ 260 (as shown by substituting the above equation):

$$S_2=\frac{\pi r^2}{4}-S_1$$
$$=\frac{\pi r^2}{4}-\frac{r^2}{2}\sin^{-1}\left(\frac{x}{r}\right)-\frac{x}{2}\sqrt{r^2-x^2}$$

The total overlap of the area may be determined by multiplying the above relationship by 4, to produce:

$$A_o=\pi r^2-2r^2\sin^{-1}\left(\frac{x}{r}\right)-2x\sqrt{r^2-x^2}$$

The center of the overlap area of the two circles shown in FIG. 2(c) may be represented by $x_0$. This may be used to define x:

$$x=\frac{x_o}{2}$$

Which is then substituted into the above area equation:

$$A_o=\pi r^2-2r^2\sin^{-1}\left(\frac{x_o}{2r}\right)-x_o\sqrt{r^2-\left(\frac{x_o}{2}\right)^2}$$

Figure 2D:
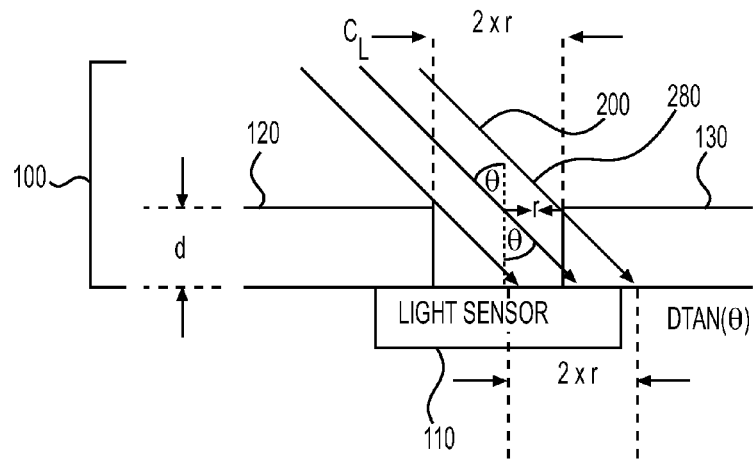

As shown in FIG. 2(d), the sensor 200 is shown with additional incident of light angles. The incident of light 280 may be substituted into the following the equations to further derive the area:

$$x_o=d\tan\theta$$

$$A_o=\pi r^2-2r^2\sin^{-1}\left(\frac{d\tan\theta}{2r}\right)-d\tan\theta\sqrt{r^2-\left(\frac{d\tan\theta}{2}\right)^2}$$

Figure 3A:
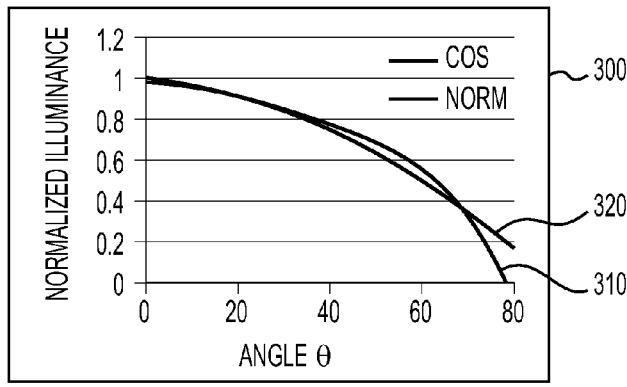
FIGS. 3(a) and (b) illustrate graphs of the normalized function employing the light sensor of FIG. 1 with regards to a cosine function.

This is referred to as the normalized function, and in FIGS. 3(a) and (b), and explanation will be shown as to why this relationship proves that the sensor 100 is an adequate substitute for a sensor to be employed in the Silverstein relationship.

$$A_o=1-\frac{2}{\pi}\sin^{-1}\left(\frac{d\tan\theta}{2r}\right)-\frac{d}{\pi r^2}\tan\theta\sqrt{r^2-\left(\frac{d\tan\theta}{2}\right)^2}$$

The above equation may be solved to produce graphs 300 and 350 to find an optimal ratio of d to r. Once the ratio is known, a sensor 100 may be spaced accordingly.

FIGS. 3(a) and (b) illustrate graphs 300 and 350 of the normalized function 310 explained above with regards to a cosine function 320. As shown, the normalized function 310 is an approximation of the cosine function.

Figure 3B:
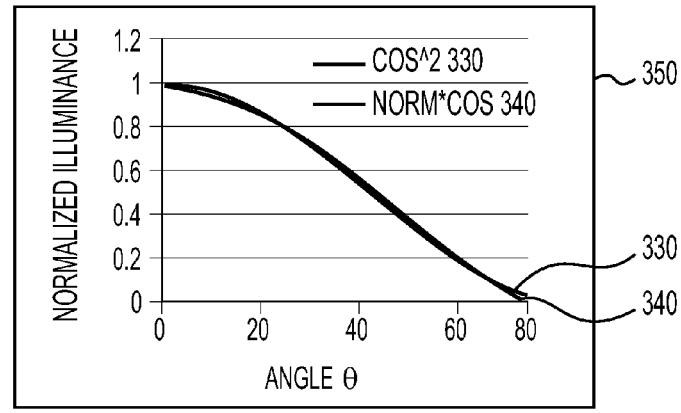

Referring to FIG. 3(b), the normalized function 310 is multiplied with a $E\cos(\Theta)$, and produces plot 340. This relationship is defined by the following expression:

$$E_M=E\cos\theta\left[1-\frac{2}{\pi}\sin^{-1}\left(\frac{d\tan\theta}{2r}\right)-\frac{d}{\pi r^2}\tan\theta\sqrt{r^2-\left(\frac{d\tan\theta}{2}\right)^2}\right]$$

Graph 350 shows plot 340 (the above expression) significantly matches a cosine squared function 330. As explained in the Silverstein methodology (which is described in a reference submitted along with this application), a sensor that provides a significant cosine squared property is an ideal sensor for employment in luminance adjustment systems.

Figure 4A:
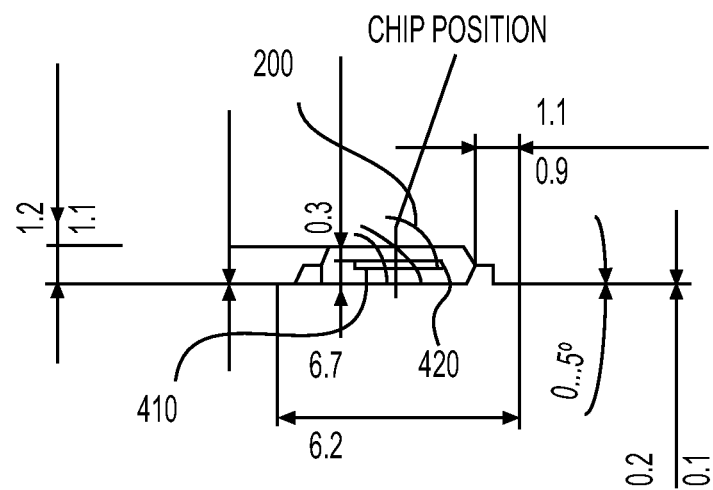
FIGS. 4(a) and (b) illustrate an example implementation of the sensor of FIG. 1.

FIGS. 4(a) and (b) illustrate an example implementation of a sensor 100. The distances are merely exemplary and are not limiting to other implementations of sensor 100.

As shown in FIGS. 4(a) and (b), a cross-sectional view 400 is provided. A chip 410 associated with the sensor 110 is shown. On top of the chip 410 is an epoxy layer 420. The epoxy layer 420 may cause an addition angle of inflection of light rays 200 (as shown by the slight bend in FIG. 4(a)). However, when employing approximately 0.3 mm of clear epoxy, experimental results have shown the epoxy 420 does not significantly affect the results.

Figure 4B:
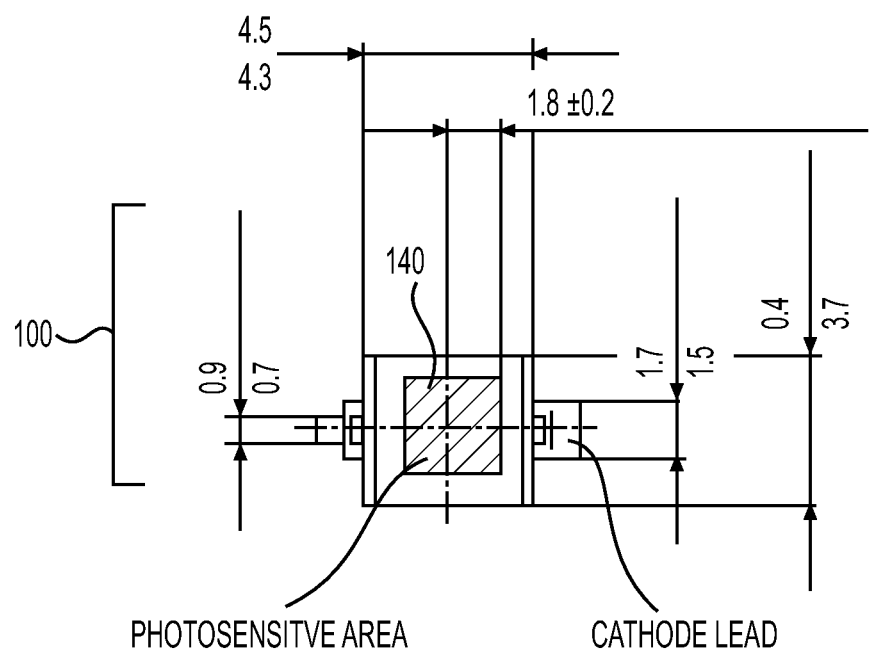

FIG. 4(b) illustrates a top overview of the sensor 100. The distances and dimensions (in millimeters) provided below were experimentally shown to maximize the sensor 100 as a suitable candidate to employ with various adjustment methods of light known in the art.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

I claim:

1. A method for implementing a forward-looking light sensor, the method comprising:
   providing a first light blocking material, a second light blocking material; and a light sensor with a first surface and a second surface;
   disposing the first light blocking material on the first surface of the light sensor and the second light blocking material is disposed on the first surface of the light sensor, and
   forming an aperture of value r with the first light blocking material and the second light blocking material forming an aperture, wherein the aperture formed is circular, and sizing the first light blocking material and the second light blocking material with a thickness of value d that extends away from the first surface and the second surface, solving a function to determine an optimal value of d and r, wherein the function is related to an area of the aperture and an angle of incident light being detected by the light sensor, wherein the normalized version of the function is:

$$A_o = 1 - \frac{2}{\pi}\sin^{-1}\left(\frac{d\tan\theta}{2r}\right) - \frac{d}{\pi r^2}\tan\theta\sqrt{r^2 - \left(\frac{d\tan\theta}{2}\right)^2},$$

wherein $A_o$ is an overlap area of the first light blocking material with the second light blocking material, and $\theta$ is an angle of incident light.

* * * * *